United States Patent

[11] 3,546,435

[72] Inventor Stanley B. Welch
Louisville, Kentucky
[21] Appl. No. 844,969
[22] Filed July 25, 1969
[45] Patented Dec. 8, 1970
[73] Assignee General Electric Company
a corporation of New York

[54] PURE SOLID STATE SELF-CLEANING OVEN CONTROL
10 Claims, 5 Drawing Figs.

[52] U.S. Cl. .................................................. 219/501,
219/505
[51] Int. Cl. ..................................................... H05b 1/02
[50] Field of Search ......................................... 219/397,
483, 494, 501, 504, 505

[56] References Cited
UNITED STATES PATENTS
3,381,226 4/1968 Jones et al. ..................... 219/501X
3,426,969 2/1969 Anderson ..................... 219/501X Primary Examiner—Bernard A. Gilheany
Assistant Examiner—F. E. Bell
Attorneys—Richard L. Caslin, Harry F. Manbeck, Jr., Joseph B. Forman, Oscar B. Waddell and Frank L. Neuhauser ABSTRACT: An oven temperature control circuit for use with a self-cleaning oven. A bake oven resistive heating element is connected in parallel with the series combination of a broil and a mullion oven resistive heating element. The power output to the oven resistive heating elements is controlled by a pair of TRIACS connected in series with the oven resistive heating elements. The control circuit includes a zero voltage switch which, in response to a voltage from a temperature-sensitive resistance network, provides a gating signal through a transistor to control the conduction of each of the two TRIACS. The temperature-sensitive resistance network includes a linear potentiometer for selecting a desired oven temperature which potentiometer is connected in parallel with a series combination of a diamond thermistor temperature sensor and a pair of fixed resistors.

INVENTOR.
STANLEY B. WELCH
BY Richard L. Cashin
HIS ATTORNEY

INVENTOR.
STANLEY B. WELCH
BY Richard L. Caelin
HIS ATTORNEY

3,546,435

PURE SOLID STATE SELF-CLEANING OVEN CONTROL

BACKGROUND OF THE INVENTION

This invention relates generally to an oven temperature control circuit and, more particularly, to such a circuit which employs bidirectional current-conducting semiconductor devices (TRIACS).

In recent years, a self-cleaning oven design has been perfected using a pyrolytic process which automatically cleans food particles and grease spatterings from the inner walls of the oven cavity to free the housewife of the drudgery of washing, scrubbing, or scraping the baked-on soil that normally accumulates during the various cooking operations. For a better understanding of the operating principles of a self-cleaning oven, attention is directed to U.S. Pat. No. 3,121,158 of Bohdan Hurko which is assigned to the General Electric Company, the assignee of the present invention. Upon the perfection of the principle of automatic heat cleaning of domestic ovens by the method of pyrolysis, many different systems for applying the heat and controlling the operations were devised to obtain optimum cleaning results.

In recent years, the growth of silicon-controlled rectifiers has provided particular advantages in the field of power supply and power control. Silicon-controlled rectifiers are basically three-terminal semiconductor rectifiers operative to switch from a high to a low impedance state between two main terminals in response to a relatively short impulse on a gate terminal. To control the supply of alternating current power, two such devices, connected with opposing orientations, are generally interposed between the supply and the load. Control circuitry is used to selectively deliver independent triggering pulses to each device in accordance with the desired operating scheme. One of the controlled rectifiers may be eliminated by using a bridge circuit wherein four conventional rectifiers provide the bridge and a single controlled rectifier is connected across its output. This technique reduces the required number of controlled rectifiers, but it does so at the added expense of added conventional rectifiers and added power loss in these rectifiers.

The development of controllable bidirectional current-conducting semiconductors has provided the answer to the need for simple control over the delivery of alternating current power. These semiconductors normally exhibit a high impedance characteristic between two main current-carrying terminals. When a relatively low power triggering impulse is applied to a third or gate terminal, the device switches to a second state wherein a low impedance exists between the current-carrying terminals. These semiconductors are bilateral in nature and permit current conduction in either direction with equal facility. Further more, the triggering impulses required to effect switching from a high to a low impedance state may generally be of either polarity. Obviously, the bilateral characteristics of the main current carrying conducting path and the flexibility offered by the permissible forms of triggering impulses render a bilateral current-conducting semiconductor device (TRIAC) admirably suited for control of alternating current which is fed to a resistance heating element of an electric oven.

In any oven temperature control circuit, some type of temperature sensing device must be utilized. Standard components are used whenever possible to take advantage of the years of engineering development and know-how gained by working with the components. The high oven temperatures experienced during a heat cleaning operation, however, present a problem as to how to protect the temperature sensor in such a way that it remains operational. Hydraulic oven thermostats and temperature sensors have been used for many years and have been perfected to a high degree of reliability. The hydraulic bulb associated with this type of thermostat, however, is especially susceptible to damage from the high cleaning temperature. Many complicated and costly systems have therefore been developed for protecting the hydraulic bulb from the heat cleaning cycle. A novel solution to the problem would be to eliminate the hydraulic bulb thermostat and replace it with a different type of temperature sensor. One possible alternative would be the use of a diamond thermistor temperature sensor. Diamond thermistors, however, have negative temperature-resistance characteristics which are highly nonlinear. This characteristic makes it difficult to obtain accurate, low cost, rheostat temperature-setting controls. For this reason, the use of diamond thermistors as temperature sensors in electric ovens has been rather limited.

SUMMARY OF THE INVENTION

It is one object of this invention, therefore, to provide a pure solid state oven temperature control which utilizes bidirectional current-conducting semiconductor devices.

Another object of this invention is to provide a pure solid-state oven temperature control circuit which yields a variable oven temperature for cooking and a single high oven temperature for the cleaning cycle.

It is a further object of this invention to provide such an oven control which utilizes a diamond thermistor temperature sensor.

It is a final object of this invention to provide an oven control circuit which results in a relatively linear temperature-rotation characteristic using commercially available linear potentiometers for the oven temperature setting control and a diamond thermistor for the oven temperature sensor.

Briefly stated, the objects of this invention are carried out by providing an oven temperature control circuit which includes a synchronous switch module which, in response to a voltage from a temperature-sensitive resistance network, provides a gating signal through a transistor to control the conduction of each of two TRIACS connected in series with oven resistive heating elements. The synchronous switch is an active circuit device including a differential amplifier, whose input terminals are connected to two different points in the temperature-sensitive resistance network. The resistance network includes a linear potentiometer connected in parallel with a series combination of a diamond thermistor temperature sensor and a pair of fixed resistors.

BRIEF DESCRIPTION OF THE DRAWINGS

While the specification concludes with claims particularly pointing out and distinctly claiming the subject matter of the invention which is sought to be protected, an understanding of the invention may be gained from the following detailed description of a preferred embodiment in connection with the accompanying drawings, in which:

Figures 1, 2:
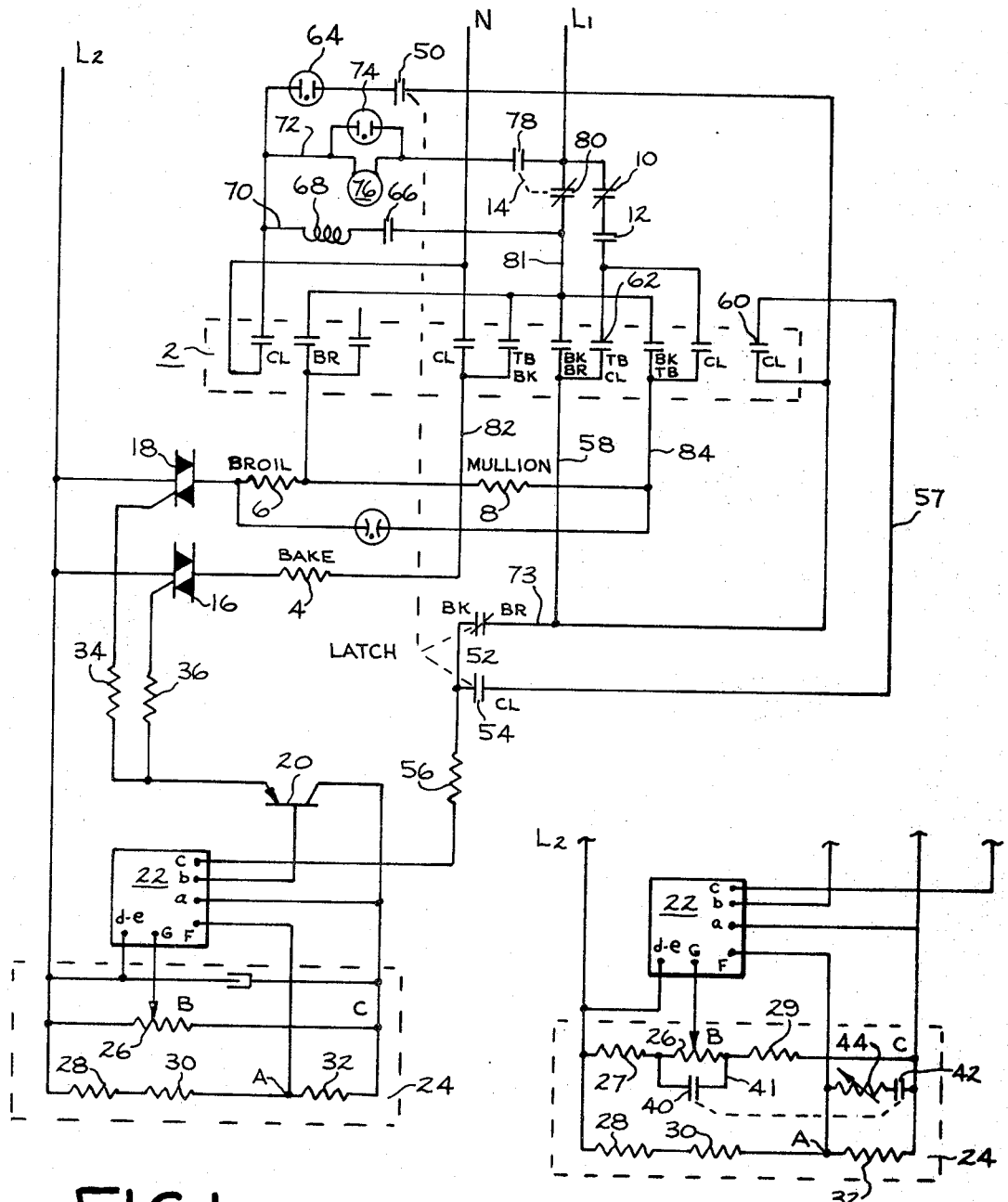
FIG. 1 is a circuit schematic of an embodiment of an oven control circuit constructed in accordance with the principles of this invention.
FIG. 2 is a circuit schematic of a temperature-sensitive resistance network which may be utilized with the oven control circuit of FIG. 1.

Referring to the drawings wherein like numerals refer to like elements throughout, the present invention is provided with a standard electrical service of three-wire Edison source of power; nominally of 240 volts, 60-cycle, AC which is usually available in an average residence having adequate wiring. This voltage source has a pair of line wires $L_1$ and $L_2$ and a grounded neutral conductor N for supplying an oven selector switch 2 which controls the electrical load characterized by electric resistance heating circuits, which in this particular case, comprise the three heating elements of an electric range; namely, a bake heating element 4, a broil heating element 6, and a mullion or perimeter heating element 8. The oven selector switch 2 is shown with a plurality of switch contacts which are labeled with designations of specific operations such as bake (BK), broil (BR), time-bake (TB), and clean (c.l.) Basically, these contacts are closed only during operation of the labeled cycle. That is, the contacts labeled (BK) are closed only during baking operation and are open at all other times. The other labeled contacts operate similarly.

The bake heating element 4 and the broil heating element 6 are standard electrical heating elements with the bake element 4 being arranged just above the bottom wall of an oven liner (not shown) and the broil heating element 6 being located just under the top wall of the oven liner. Because it is important to have generally uniform temperatures on the walls of the oven liner and door during a heat cleaning operation, the additional heating element known as the mullion or perimeter heater 8 is assembled around the front of the oven adjacent the door opening.

As can be seen in FIG. 1, during a baking operation the bake element 4 is connected across lines $L_1$ and $L_2$ at 240 volts. During a broiling operation, the broil element 6 is the only element that is energized; and it also is connected across lines $L_1$ and $L_2$ at 240 volts. Finally, during a heat cleaning operation, the broil element 6 and mullion element 8 are connected in series across lines $L_1$ and $L_2$ at 240 volts, while the bake element 4 is connected in parallel with the series connection of the bake and mullion elements across lines $L_1$ and $L_2$.

As further shown in FIG. 1, the lead lines to the oven selector switch 2 are provided with a circuit breaker switch 10, a timer switch 12, and a temperature limiting switch 14. These elements are standard in most electric self-cleaning ovens and their operation is well known to those skilled in the art.

All of the above elements are generally found in many self-cleaning electric ovens. Applicant's invention does not relate solely to the above elements but consists primarily of means for governing the operation of the above elements. As shown in the FIGS. the means provided by applicant comprises a pair of bidirectional current conducting semiconductor devices (TRIACS), designated by the numerals 16 and 18, one of which is connected in series with the bake heating element 4, and the other of which is connected in series with the series combination of the broil heating element 6 and the mullion heating element 8. The gates of the TRIACS 16 and 18 are driven by a single PNP transistor 20 which is switched on or off by a zero voltage switch labeled 22.

The zero voltage switch 22 comprises basically a monolithic integrated circuit which acts as a combination threshold detector and trigger circuit for controlling the TRIACS 16 and 18. Circuits of this type are well known and provide a series of pulses synchronized with the zero crossover voltage points of the AC line voltage connected thereto. Such a switch is more fully described and is claimed in U.S. Pat. No. 3,381,226 to C. M. Jones et al., also assigned to the General Electric Company, the assignee of the present invention. Such a switch is presently commercially available from the General Electric Company, Semiconductor Products Division, under a specification designation PA 424.

The zero voltage switch 22 provides a differential input stage which is designed to sense resistance bridges. In this application, the resistance bridge takes the form of a temperature-sensitive resistance network which is generally labeled 24, and which comprises an oven temperature selector circuit which includes a commercially available, 20 kilohm linear potentiometer 26 (by which an operator sets a desired oven temperature) and may include resistors 27 and 29. This circuit is connected in parallel with an oven temperature sensor circuit which is comprised of a series combination of a diamond thermistor temperature sensor 28 and a pair of fixed resistor elements 30 and 32. This temperature-sensitive resistance network, as described, acts as a pair of voltage dividers which apply potentials to two inputs (pins $f$ and $g$) of a differential amplifier in the zero voltage switch 22.

Within the temperature-sensitive resistance network 24, the potential between points A and C (FIG. 1) increases as the temperature sensor 28 heats. When the temperature of the sensor 28 is below the desired temperature, as set by the potentiometer 26, the potential at point A is less than that at point B and the zero voltage switch 22 furnishes synchronous gate pulses to the TRIACS 16 and 18. Conversely, when the temperature of the sensor 28 is above the desired temperature, the potential at point A is greater than that of point B and no gate pulses are applied by the zero voltage switch 22 to the TRIACS and heating is interrupted, allowing the oven to return to the desired temperature.

The output from pin $b$ of the zero voltage switch 22 is insufficient, however, to drive two TRIAC gates connected in parallel. For this reason, the output from pin $b$ is connected to the base of the PNP transistor 20. In addition, two resistors, designated by the reference numerals 34 and 36, are provided one in series with each TRIAC gate, as shown in FIG. 1. These resistors should have the same values and work well when they are of approximately 82 ohms resistance. When coupled to the emitter of the PNP transistor 20, the resistors 34 and 36 provide an impedance load to the zero voltage switch 22 and further provide an adequate decoupled drive to the TRIAC gates. Thus described, the power supplied to the bake heating element 4 is directly controlled by the output of the TRIAC 16 while the power supply to the broil heating element 6 and the mullion heating element 8 is directly controlled by the output of the TRIAC 18.

Figure 3:
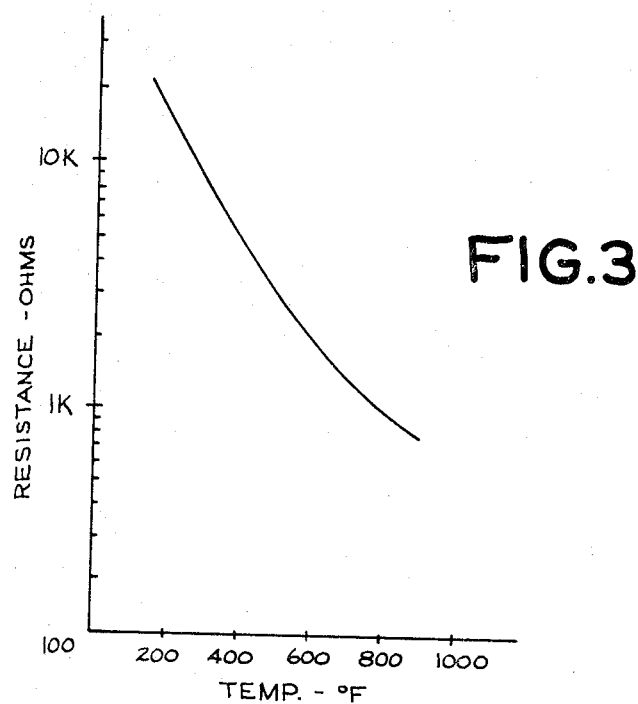
FIG. 3 is a graphical plot of the temperature characteristics of a diamond thermistor.
Figure 4:
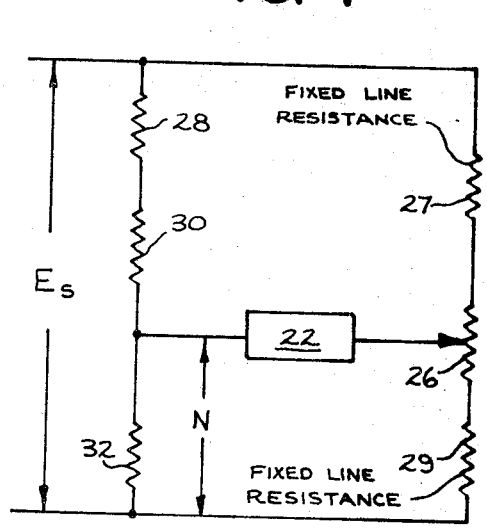
FIG. 4 is a partial schematic view of a temperature compensating network similar to that of FIG. 2.

As previously mentioned, the operating temperature of the oven is selected by the operator by rotation of the linear potentiometer 26. The diamond thermistor temperature sensor 28, however, has a relatively high negative temperature resistance characteristic which is highly nonlinear as shown in FIG. 3. This characteristic makes it difficult to obtain accurate low-cost rheostat temperature setting controls. Applicant has found that the use of the fixed resistors 30 and 32 in series with the diamond thermistor 28 has permitted use of a commercially available linear potentiometer 26 which results in a relatively linear temperature-rotation characteristic of the overall system. For the circuit shown in FIG. 4, the optimum values of the resistors 30 and 32 can be calculated from the following equations when the potentiometer 26 is set so that the sensor divider ratio N can vary from .35 to .80:

(1) $$\frac{R_{32}}{R_{32}+R_{30}+R_{28}(150°)}=.35$$

where $R_{28}(150°)=150°F$. Resistance of thermistor 28

(2) $$\frac{R_{32}}{R_{32}+R_{30}+R_{28}(550°)}=.80$$

where $R_{28}(550°)=550°F$. Resistance of thermistor 28

(3) $$R_{32}=\frac{N_1}{(1-N_1)}R_{30}+R_{28}(150°)$$

where $N_1=.35$ (4) $$R_{32}=\frac{N_2}{(1-N_2)}R_{30}+R_{28}(550°)$$

where $N_2=.80$ (5) $$R_{32}=R_{32}$$

(6) $$\frac{N_1}{(1-N_1)}[R_{30}+R_{28}(150°)]$$
$$=\frac{N_2}{(1-N_2)}[R_{30}+R_{28}(550°)]$$

Solving this algebraically lends to the following exact solutions:

(7) $$R_{30}=\frac{N_2(1-N_1)R_{28}(550°)-N_1(1-N_2)R_{28}(150°)}{N_1(1-N_2)-N_2(1-N_1)}$$

and (8) $$R_{32}=\frac{N_1[R_{30}+R_{28}(150°)]}{1-N_1}$$

Figure 5:
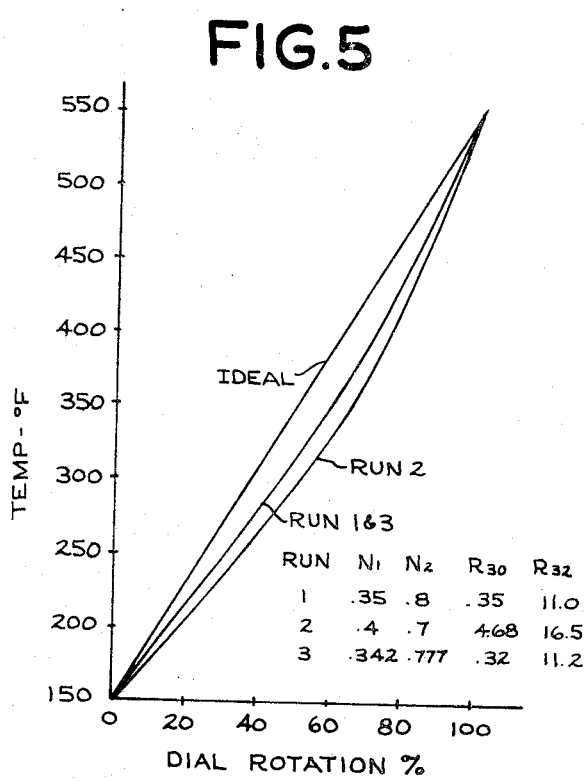
FIG. 5 is a graphical plot of the temperature characteristics of the circuit of FIG. 4.

Equations (7) and (8) can then be solved for $R_{30}$ and $R_{28}$ by substituting different values of $N_1$ and $N_2$. Results for a number of different values of $N_1$ and $N_2$ are plotted in FIG. 5. From this plot it can be seen that the scale is most linear when the value of the resistor 30 is 820 ohms and the value of the resistor 32 is 11,200 ohms.

The above-described system is capable of providing variable oven temperatures between 150 and 550° F. such as are commonly found in an electric oven. In a self-cleaning oven, however, some means must be provided for obtaining a single high oven temperature for the cleaning cycle. FIG. 2 shows one means of achieving this single high oven temperature while yet providing for the variable range of 150 to 550° F. The circuit shown in FIG. 2 is provided with a pair of latch operated switches 40 and 42, which are used to disable the normal bake control and to establish the clean temperature setting. During a baking operation, the switches 40 and 42 are open and the circuit shown in FIG. 2 functions similarly to that shown in FIG. 1 with the potential at point C varying between .35 and .8 of the supply voltage $E_s$. For a cleaning operation, the switches 40 and 42 are closed by means of a latch mechanism (not shown) associated with the door of the oven. With the switches 40 and 42 closed, a line 44 shunts the potentiometer 26 and establishes the voltage at point B at .635 $E_s$ regardless of the slider position of the potentiometer 26. The contact switch 42 connects a clean calibrating resistor 46 in shunt with the fixed resistor 32 in the lower leg of the temperature-sensitive resistance network 24. The value of the calibrating resistor 44 is set so that the potential at point A is .635 $E_s$ when the diamond thermistor sensor 28 is at the desired cleaning temperature. Thus, the effect of the circuit shown in FIG. 2 is to hold the input voltage to the zero voltage switch 22 at a constant value. This circuit, when used in combination with the above-described oven control circuit, provides a simple solid-state oven temperature control which yields variable oven temperatures in the range of 150 to 550° F. and a single high temperature for cleaning purposes.

As in most self-cleaning ovens, it has been found desirable to provide safety mechanisms for the oven door to insure that the oven door is closed and cannot be opened while the oven is being operated on the cleaning cycle. For this reason, a double-pole, double-throw, latch switch, consisting of the contacts 50, 52 and 54, is provided. These elements are actuated by a suitable door latch (not shown). Switches 40 and 42 (FIG. 2) are further elements of the latch switch which sense whether or not the latch is locked. When set in the clean position, the latch switch contacts 50 and 54 are closed. The zero voltage switch 22 is then fed power from $L_1$ through pin c via a resistor 56, the contacts 54, a lead 57, switch 60 of the oven selector switch 2, a lead 58, a switch 62, the circuit breaker 10, and the timer 12. This assures that the door is latched, the selector is set at clean, and the timer is set to establish a clean cycle. A cleaning light 64, energized by closing of the contacts 50, is also provided to warn an operator that a cleaning cycle is taking place. For all other oven functions, the zero voltage switch 22 is fed through the normally closed contacts 52.

A conventional series combination of a momentary pushbutton switch 66 and a latch solenoid 68 are provided in a line 70 which branches from the lead line $L_1$. The solenoid 68 is provided to actuate a solenoid-operated locking means (not shown) which locks the door latch mechanism in both the open and closed positions as is well known in the art. A parallel branch 72 includes a lock light 74 and an air fan 76 which provides cooling air around the oven during the cleaning cycle. The line 72 is connected in series with line $L_1$ upon closing of contacts 78 of the single-pole, double-throw temperature limiting switch 14. Contacts 80 of the switch 14 are normally closed when the oven is cool, but as the oven heats, contacts 80 open and contacts 78 close thus turning on the light 74 and the fan 76 and disconnecting the momentary switch 66 and the latch solenoid 68. The light 74 also warns an operator that the door latch is locked, while the disconnected solenoid 68 prevents an operator from opening the oven during the cleaning cycle. For a more complete description of these safety features, reference may be made to U.S. Pat. No. 3,350,542, to Getman, assigned to the General Electric Company.

For a better understanding of the overall circuitry, a typical circuit will be described. With the oven selector switch 2 set for a baking cycle (all the contacts labeled BK are closed, while all of the remaining contacts are open), the circuit would be as follows: current would flow from lead line $L_1$ through the normally closed contact 80 to the oven selector switch 2 by means of a line 81. Current flows through the oven selector switch 2 through all contacts marked BK and thus leaves the oven selector switch 2 closed to provide power in lines 58, 82, and 84. Current in line 82 flows through the bake heating element 4 and current in line 84 flows through the mullion unit 6 and the broil unit 8 whenever the TRIACS 16 and 18 are conducting, while the current flowing through line 58 continues through the normally-closed, latch-operated switch element 52 and through the voltage drop resistor 56 to pin c of the zero voltage switch 22.

As can be seen from the above description, applicant has provided a pure solid-state oven temperature control which may be utilized with a self-cleaning oven and which provides a variable temperature range of 150 to 550° F. and a single high temperature for cleaning purposes. Applicant has also eliminated the need for usage of a hydraulic oven thermostat by providing a temperature-sensitive resistance network which is capable of utilizing a diamond thermistor temperature sensor while providing a linear-rotation characteristic from a commercially available linear potentiometer. Applicant has further provided a simple and efficient circuit which provides sufficient output to control a pair of TRIACS connected in parallel which, in turn, control the power input to the oven resistance heating elements.

While a number of preferred embodiments of this invention have been shown and described, it will be obvious to those skilled in the art that there are certain changes and modifications which may be made in the above embodiments without departing from this invention in its broader aspects and, therefore, it is intended that the appended claims cover all such changes and modifications as fall within the true spirit and scope of this invention.

I claim:

1. A circuit for controlling the supply of an alternating current voltage source to an electric oven, which circuit comprises:
   a. a first electric resistance heating circuit;
   b. a second electric resistance heating circuit;
   c. means for connecting said first and second electric resistance heating circuits in parallel;
   d. a first TRIAC connected in series with said first heating circuit;
   e. a second TRIAC connected in series with said second heating circuit;
   f. a temperature-sensitive resistance network, means for connecting said temperature-sensitive resistance network to the voltage source, said network including an oven temperature sensor circuit and an oven temperature selector circuit;
   g. a zero voltage switch having a first input connected to a point intermediate said oven temperature sensor circuit and a second input connected to a point intermediate said oven temperature selector circuit; and
   h. said zero voltage switch providing a series of pulses synchronized with the zero crossover voltage point of the alternating current line voltage, said pulses being provided to the gates of said TRIACS in response to a predetermined condition of the relative voltages at said oven temperature sensor circuit point and said oven temperature selector circuit point.

2. The circuit recited in claim 1 which further includes a PNP transistor and a pair of resistors interposed in said circuit each between said zero voltage switch and one of said TRIACS, said resistors being connected intermediate the emitter of said transistor and the respective gates of said TRIACS.

3. The circuit recited in claim 1 wherein said means for connecting said heating circuits in parallel includes a selector switch for selectively energizing said heating circuits.

4. The circuit recited in claim 1 wherein said oven temperature selector circuit comprises a linear potentiometer.

5. The circuit recited in claim 1 wherein said oven temperature sensor circuit comprises a diamond thermistor connected in series with a plurality of resistors.

6. The circuit recited in claim 5 wherein said first input contact of said zero voltage switch is connected to said oven temperature sensor circuit intermediate said resistors.

7. The circuit recited in claim 1 wherein said oven temperature selector circuit is connected in parallel with said oven temperature sensor circuit.

8. The circuit recited in claim 1 wherein said temperature-sensitive resistance network further includes means to provide a variable oven temperature for cooking and a predetermined high oven temperature for cleaning.

9. The circuit recited in claim 8 wherein said temperature-sensitive resistance network includes a latch switch for shunting a portion of said oven temperature selector circuit, a clean calibrate resistor connected in parallel with a portion of said temperature sensor circuit, and a second switch adapted to place said calibrating resistor in the circuit upon closing of said latch switch.

10. A circuit for controlling the supply of an alternating current voltage source to an electric oven, which circuit comprises:

a. a series combination of a TRIAC and first electric resistance heating circuit;
b. a second series combination of a TRIAC and an electric resistance heating circuit;
c. means for connecting said first and second series combinations in parallel, said means including a selector switch for selectively energizing said heating circuits;
d. a temperature-sensitive resistance network, means for connecting said temperature-sensitive resistance network to the voltage source, said network including an oven temperature sensor circuit and an oven temperature selector circuit; said oven temperature selector circuit including a linear potentiometer, and said oven temperature sensor circuit including a diamond thermistor in series with a pair of fixed resistors;
e. a zero voltage switch having a first input contact connected to a point intermediate said oven temperature selector circuit and a second input contact connected to a point intermediate said fixed resistors of said oven temperature sensor circuit;
f. said oven temperature sensor circuit connected in parallel with said oven temperature selector circuit; and
g. said zero voltage switch providing a series of pulses synchronized with the zero crossover voltage points of the alternating current line voltage, said pulses being provided to the gates of said TRIACS in response to a predetermined condition of the relative voltages at said oven temperature sensor circuit point and said oven temperature selector circuit point.